No. 672,727. Patented Apr. 23, 1901.
A. DE V. BALDWIN.
MEANS FOR PROTECTING COMMUTATORS.
(Application filed Feb. 14, 1901.)
(No Model.)
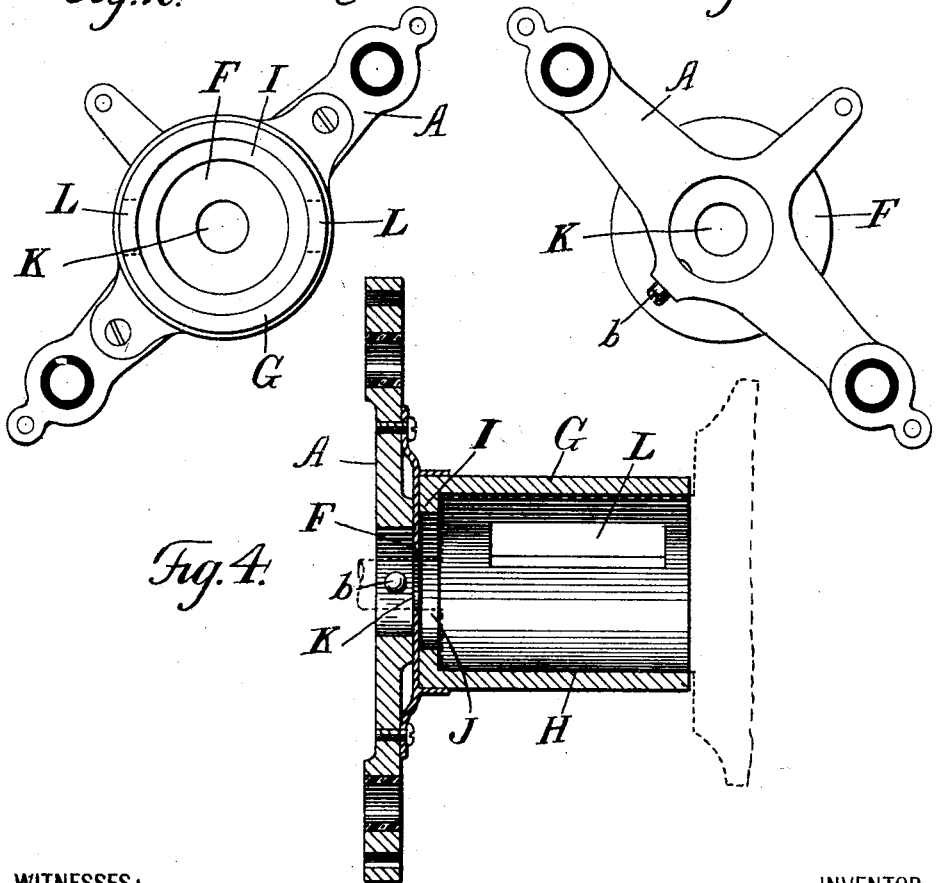
WITNESSES:
INVENTOR
Alfred de Veau Baldwin
ATTORNEYS

UNITED STATES PATENT OFFICE.

ALFRED DE VEAU BALDWIN, OF NEW YORK, N. Y.

MEANS FOR PROTECTING COMMUTATORS.

SPECIFICATION forming part of Letters Patent No. 672,727, dated April 23, 1901.

Application filed February 14, 1901. Serial No. 47,225. (No model.)

*To all whom it may concern:*

Be it known that I, ALFRED DE VEAU BALDWIN, a citizen of the United States, residing at New York, in the county of New York and State of New York, have invented certain new and useful Improvements in Means for Protecting Commutators, of which the following is a full and complete specification, such as will enable those skilled in the art to which it appertains to make and use the same.

This invention relates to means for protecting commutators of electric motors; and its main object is to provide effective means for protecting such commutators from the deposit or formation of foreign substances—such as dust, frost, or ice—thereon, and thereby preventing imperfect contact, sparking, &c.

My invention may be applied to motors or dynamos wherever these may be exposed to floating dust or other fine particles or to the action of the elements; but it is especially useful in connection with motors for operating the semaphores or signal devices of block-signal systems and with motors used with cold-storage apparatus. Such motors because of their exposed positions accumulate frost and ice upon the commutators when the temperature is low, and this accumulation prevents proper contact of the brushes with the commutators, the result being that the motors do not operate with certainty, if at all, and that the sparking is excessive. Many attempts have been made to overcome these difficulties, but up to the present time without entire success. I have found that a commutator may be completely protected from the accumulation of frost and ice thereon and from dust and other foreign substances by a protecting device or shield having an insulating-surface constructed to lie in juxtaposition with the surface of the commutator and its segments in the zone of contact of the brushes with such surface, the preferred construction being one in which this commutator protector or shield substantially incloses the commutator, and thus isolates it from the outside air, dust, &c.

In the drawings accompanying this specification and forming part of the application, Figure 1 is a perspective view of a motor having a commutator-protector embodying my invention. Fig. 2 is an enlarged end eleva-
tion of the protector and the rocker-arm of a brush-holder upon which it is secured. Fig.
3 is an opposite end elevation of the same viewed from the outer side of the rocker-arm, and Fig. 4 is a central longitudinal section of the commutator-protector and associated parts.

My invention is shown in the present case applied to the commutator of a motor of well-known construction, said motor having the usual brush-holder, one of the members of which is a rocker-arm A, mounted on a bearing $a$, in which the end of the armature-shaft B is journaled, the brush-holder being held in place in any suitable manner, as by means of a set-screw $b$. This rocker-arm carries the usual brush-holding arms or brackets C for the brushes D, the brush-holder being adjustable in the usual manner. Said arm also preferably has secured thereto a member F, forming a socket in which the commutator-protector may be seated.

This commutator-protector may be of any suitable construction, provided that it has an insulating-surface surrounding and in juxtaposition with that zone of the commutator-surface with which the brushes make contact. When such a protecting device is employed, it constitutes a shield interposed between the commutator and the air and prevents the accumulation or deposit of frost, ice, dirt, or other foreign substance upon such zone of the commutator-surface, and hence the brushes make perfect contact. There is little sparking, and the full current from the line is supplied to the motor. For the purpose of shielding the commutator most perfectly I prefer to make use of a protecting device in the form of a hollow cylindrical or tubular member having an insulating inner surface constructed to lie close to or in juxtaposition with the commutator, the space between these parts being preferably just sufficient to permit the commutator to run freely, and thus leave a minimum of space for the accumulation of foreign substances. This protecting device should be so associated with the commutator and the brushes, however, as to leave room for the brushes to make perfect electrical contact, the insulating-surface of the protector preferably covering substantially all that portion of the zone in which the brushes work except the spaces covered by the contact-surfaces of said brushes. The commutator, the brushes, and the protector may be combined in any suitable way to accomplish this result; but I prefer to employ a protector having openings in the insulating-surface thereof, in which openings the ends of the brushes may be located, such openings in the present case extending entirely through the shell of the protector, so that the brushes may be passed through such shell from the outside thereof, the brush-openings being usually of such size that the brushes practically fill the same.

In the preferred form thereof my improved commutator-protector is a rigid shell of insulating material, such as G, and has openings or slots L disposed longitudinally thereof, through which the brushes D make contact with the surface of the commutator H. This cylindrical casing or shell is preferably soapstone; but it may be any other insulating material, either rigid or yielding. If made of soapstone, there will be but little friction and undue heating of the commutator will be prevented, owing to the porous character of the insulating material. I will usually lubricate the interior of the shell in order to assure a minimum of friction. The shell G may be so formed as to practically inclose the commutator, and its opposite ends will generally have openings of different diameters, one of these, J, being an opening of reduced diameter in the outer end of the shell and in the center of an annular flange I. The opening J is of a size sufficient to receive the usual commutator-nut, and a smaller opening may be provided in the member F, through which opening K the armature-shaft will pass.

The advantages of my commutator-protector will be evident to all who are familiar with the operation of motors located in exposed places. When the commutator is completely inclosed in the manner herein described, there is no possibility of frost or ice forming upon its surface, and the brushes make perfect contact and supply the full current to the motor. When used in mills and similar places, where the floating dust is a source of danger, the sparks formed between the brushes and the commutator are blown out within the casing and all danger from fire is avoided.

It will be noticed that the slots L not only permit the brushes to pass to make contact with the commutator, but that the walls of said slots form in the inner surface of the insulating-shell a scraping edge, which will serve to scrape off and remove any foreign particles which may become attached to the commutator. It will be noticed also that by securing the commutator-protector upon the brush-holder independent adjustment of the protector is rendered unnecessary, the protector being maintained constantly in the proper position with respect to the brushes and the brush-holder. Moreover, by removing the brush-holder access may be had to the commutator for examination or repair thereof, the protector being removable with the brush-holder.

Having thus described my invention, what I claim is—

1. A commutator-protector having an insulating-surface constructed to lie in juxtaposition, and substantially in contact with a commutator in the zone of contact of the brushes.

2. A commutator-protector having an insulating-surface constructed to lie in juxtaposition with a commutator in the zone of contact of the brushes, said surface having a scraping edge.

3. A commutator-protector having an insulating-surface constructed to lie in juxtaposition, and substantially in contact with a commutator in the zone of contact of the brushes and having brush-receiving openings in said surface.

4. A commutator-protector having an insulating-surface constructed to lie in juxtaposition, and substantially in contact with a commutator in the zone of contact of the brushes and having brush-receiving slots extending through said protector.

5. A commutator-protector adapted to inclose a commutator and having an insulating-surface constructed to lie in juxtaposition, and substantially in contact with said commutator in the zone of contact of the brushes.

6. A commutator-protector having an insulating-surface constructed to inclose, and lie substantially in contact with the contact-surface of, a commutator.

7. A commutator-protecting cylinder having an insulating inner surface constructed to lie in juxtaposition, and substantially in contact with a commutator.

8. A commutator-protector having a rigid insulating-surface constructed to lie in juxtaposition, and substantially in contact with a commutator in the zone of contact of the brushes.

9. A soapstone commutator-protector having its inner surface constructed to lie in juxtaposition, and substantially in contact with a commutator in the zone of contact of the brushes.

10. The combination with a rotary commutator, and with fixed brushes, of a fixed commutator-protector associated therewith and having an insulating-surface in juxtaposition, and substantially in contact with the commutator in the zone of contact of the brushes.

11. The combination with a rotary commutator, and with a fixed brush-holder and brushes, of a commutator-protector carried by and movable with said brush-holder and associated with said brushes and having an insulating-surface in juxtaposition, and substantially in contact with the commutator in the zone of contact of the brushes.

12. The combination with a rotary commutator, and with a fixed brush-holder and brushes, of a commutator-protecting cylinder supported at one end only and associated with said brushes and having an insulating-surface in juxtaposition, and substantially in contact with the commutator in the zone of contact of the brushes.

13. The combination with a rotary commutator, and with a fixed brush-holder and brushes, of a commutator-protecting cylinder secured at one of its ends to, and movable with, said brush-holder and associated with said brushes and having an insulating-surface in juxtaposition, and substantially in contact with the commutator in the zone of contact of the brushes.

14. The combination with a rotary commutator, and with a fixed brush-holder and brushes said brush-holder having a socket, of a commutator-protecting cylinder seated at one end in said socket and associated with said brushes and having an insulating-surface in juxtaposition with the commutator in the zone of contact of the brushes.

In testimony that I claim the foregoing as my invention I have signed my name, in presence of the subscribing witnesses, this 13th day of February, 1901.

ALFRED DE VEAU BALDWIN.

Witnesses:
F. W. STEWART,
F. TELLER.